Figure 1:
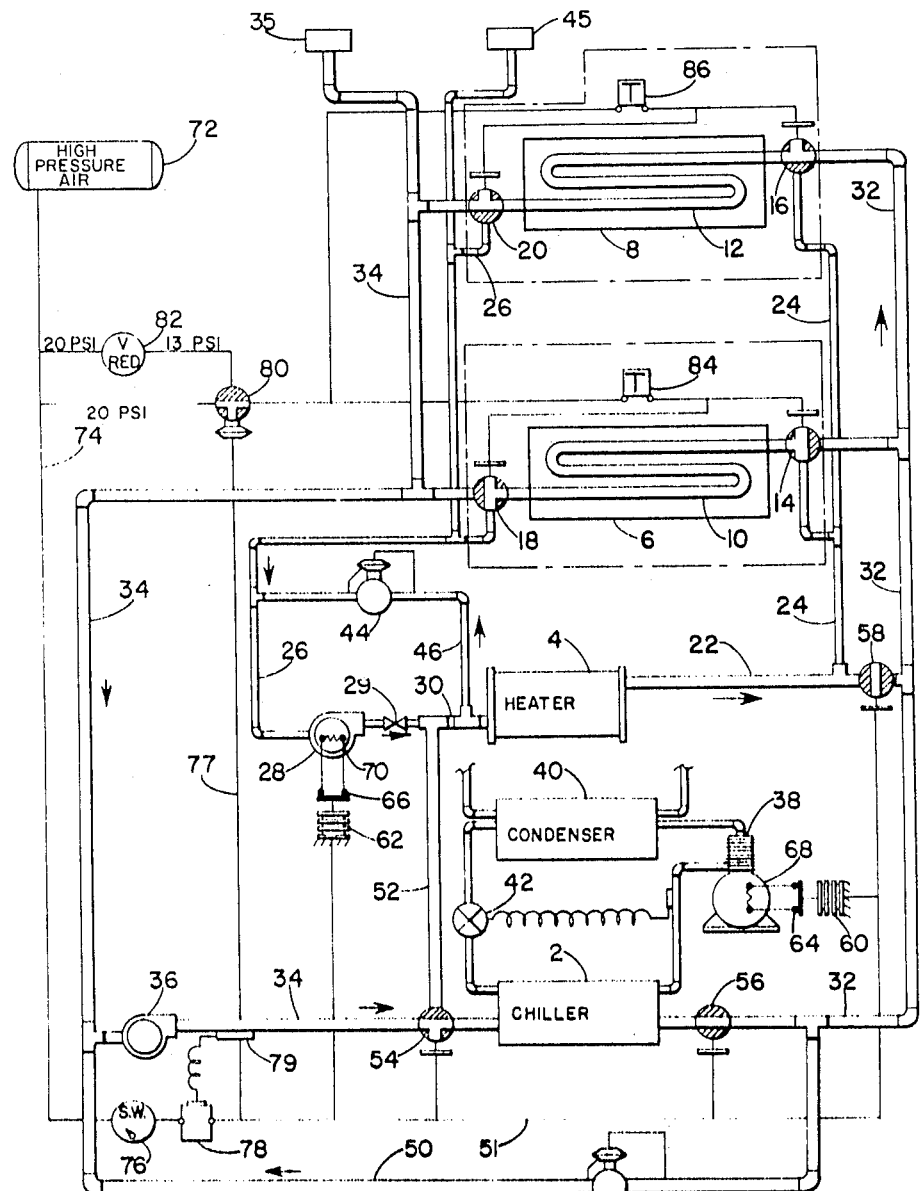

INVENTORS
CLARENCE L. RINGQUIST
JOHN W. LORENZ

INVENTORS
CLARENCE L. RINGQUIST
JOHN W. LORENZ
BY
Holmes & Andersen
ATTORNEYS

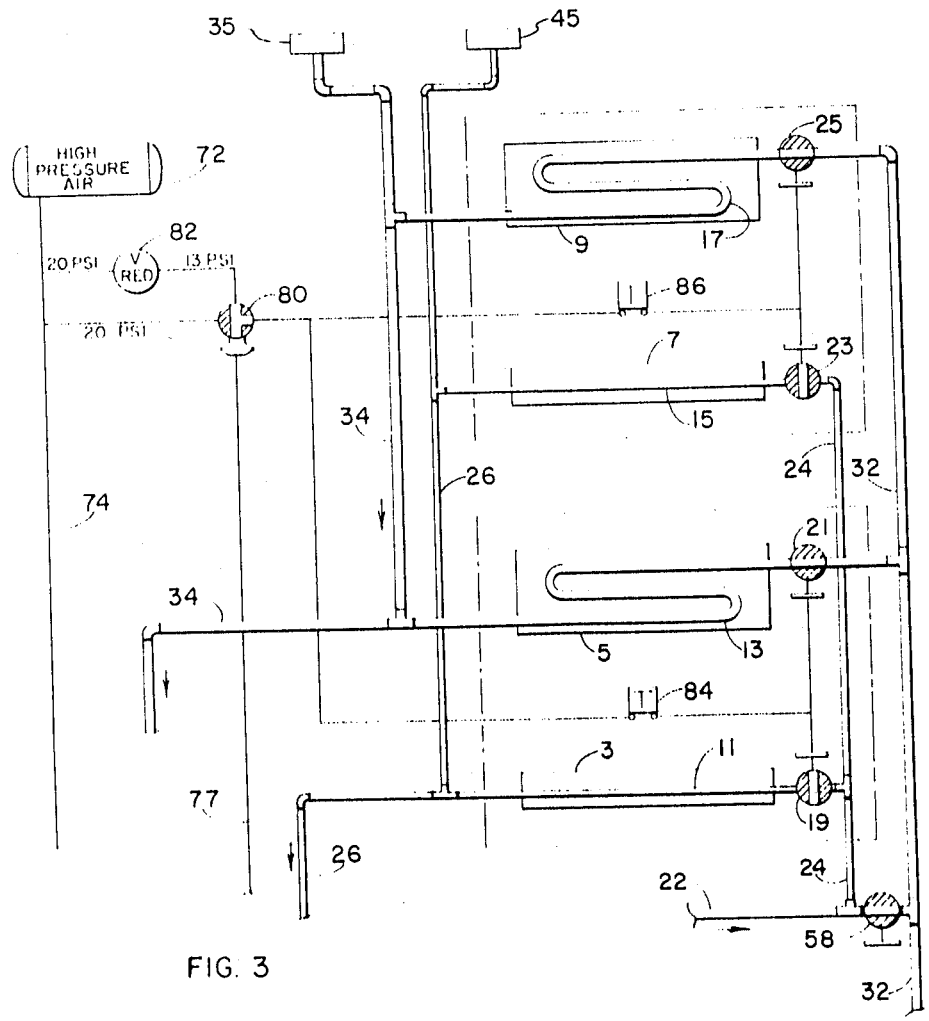

United States Patent Office 3,303,873
Patented Feb. 14, 1967

3,303,873
HEATING AND COOLING SYSTEM
Clarence L. Ringquist and John W. Lorenz, La Crosse, Wis., assignors to The Trane Company, La Crosse, Wis., a corporation of Wisconsin
Filed Mar. 29, 1965, Ser. No. 443,495
11 Claims. (Cl. 165—22)

This invention relates to an air conditioning system for a building having a plurality of zones. More particularly, the invention deals with a heating and cooling system having a plurality of heat exchangers in zones to be conditioned, and means for supplying hot or chilled water to the heat exchangers in each zone from either a water heater or water chiller in response to the temperature demands of each conditioned space.

Systems incorporating separate supply and return pipes leading to and from the heat exchangers in both the hot and chilled water circuits in a so-called four-pipe arrangement are known. A main disadvantage of such systems is the high cost resulting from furnishing separate return pipes for both the hot and chilled water. The three-pipe systems now in use eliminate this difficulty by using a common reutrn pipe for the hot and chilled water in combination with a hot water supply pipe and a chilled water supply pipe. However, when cold water from a heat exchanger in one zone is mixed with hot water from a heat exchanger in another zone in a common return line, there is a loss of the energy expended in heating and refrigerating the water initially.

It is therefore an object of this invention to provide a heating and cooling system which retains the nonmixing benefits achieved through the use of separate hot and chilled water return lines and at the same time greatly reduces the high piping costs normally associated with four-pipe systems.

More specifically, an object of this invention is to provide a four-pipe heating and cooling system having hot water supply and return pipes of smaller than standard size, and incorporating means connecting the heater of the hot water circuit to the chilled water circuit whereby the relatively larfge chilled water piping is used to circulate hot water during winter operation when the heating demand is high.

A further object of this invention is to provide a heating and cooling system as set forth in the immediately preceding object and incorporating pneumatically actuated valves in the chilled and hot water circuits and pneumatically actuated, reversible action thermostats in the conditioned zones which are actuated to permit the circulation of hot water through the chilled water circuit during periods of high heat load.

A fourth object is to provide a heating and cooling system as aforementioned having separate heating and cooling coils in each heat exchange zone.

Another object is to provide a heating and cooling system as aforementioned wherein the heat from the condenser of the refrigeration system for the water chiller is used to supply hot water during mild weather conditions.

Figure 2:
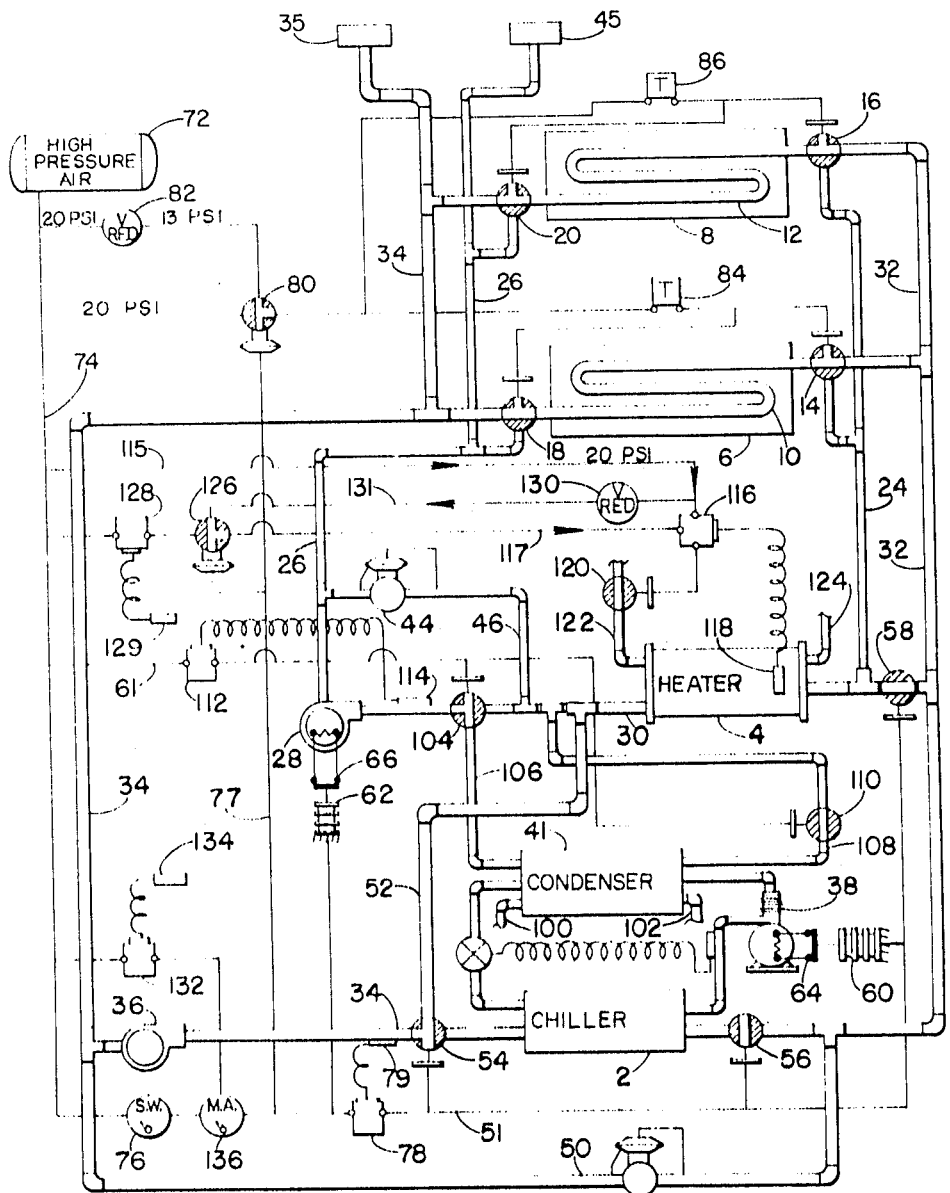

These and other objects and advantages of the invention will become apparent from the following description made with reference to the accompanying drawings in which:

FIGURE 1 is a schematic illustration of the four-pipe heating and cooling system of the invention including the controls;

FIGURE 2 is a schematic illustration of the four-pipe heating and cooling system of the invention including the controls and piping arrangement for utilizing the heat from the condenser of the refrigeration system for the water chiller to supply hot water; and FIGURE 3 is a modification of the arrangements shown in FIGURES 1 and 2 wherein separate heating and cooling coils are used in each conditioned zone.

With reference to FIGURE 1 of the drawings, a four-pipe heating and cooling system is shown incorporating a water chiller 2 and water heater 4. Heat exchange units 6 and 8 are located in two different zones to be conditioned. Although only two heat exchange units have been shown, there obviously may be any number of zones and any number of heat exchange units in each zone depending upon the demands of the particular application. Each of the heat exchange units 6 and 8 is comprised of a single coil 10 and 12 respectively.

Depending upon the temperature demands of each zone, hot or chilled water is directed to coils 10 and 12 by pneumatically actuated three-way valves 14 and 16. Three-way valves 18 and 20 located at the outlet of coils 10 and 12 respectively are synchronized with inlet valves 14 and 16 so as to direct the water to the source from which it was supplied. Thus with inlet valve 14 positioned to direct hot water from supply pipes 22 and 24 into coil 10, outlet valve 18 will be in a position to pass the water into hot water return pipe 26, through which the water is circulated to heater 4 by electric motor driven pump 28. In like manner, outlet valve 20 will direct water from coil 12 into chilled water return pipe 34 when inlet valve 16 is positioned to permit chilled water from supply pipe 32 to enter coil 12. Pump 36 circulates the water through pipe 34 to chiller 2.

The water is cooled in chiller 2 by means of a refrigeration system comprising compressor 38, condenser 40 and expansion valve 42. Refrigerant compressed by compressor 38 passes through condenser 40 and expansion valve 42 by interconnecting piping to chiller 2 where it evaporates to cool the water before returning to compressor 38.

In order to prevent an excessive pressure build-up downstream of hot water pump 28 when all zones are calling for cooling and the inlet valves 14 and 16 are closed to the hot water supply pipe 24, differential pressure relief valve 44 is provided in bypass conduit 46 around pump 28. When a predetermined high pressure is established downstream of pump 28, valve 44 opens and permits water to be circulated through bypass conduit 46 back into return pipe 26. Differential pressure relief valve 48 in bypass conduit 50 around chiller 2 operates in the same manner to prevent an excessive pressure build-up downstream of chilled water pump 36 and to insure a certain minimum water flow through the chiller when valves 14 and 16 are closed to chilled water supply pipe 32.

Expansion tanks 35 and 45 in hot and cold water return pipes 26 and 34 respectively maintain the desired pressure and receive any excess water due to expansion from either the hot or chilled water circuits.

The high piping costs normally incurred in a four-pipe system are reduced in the system of FIGURE 1 by making hot water supply pipe 24 and return pipe 26 of smaller than standard size. These pipes may be reduced in size as much as 35 to 40 percent. This is possible because the hot water circulating system is used for heating only during mild seasons. Thus the quantity of hot water required to be circulated is less than normal, and smaller than normal size hot water pipes may be used. In order to handle the high heat loads during cold weather, provision is made to circulate hot water through the relatively large chilled water pipes by means of chilled water pump 36. In this way, an increased capacity piping system necessary for the circulation of greater quantities of hot water during the winter season is made available. For this purpose, cross-over pipe 52 of the same size as chilled water supply and return pipes 32 and 34 is connected between three-way valve 54 at the inlet to chiller 2 and pipe 30 at the inlet to heater 4. Also, normally open two-way valve 56 is located in supply conduit 32 at the outlet of the chiller, and normally closed two-way valve 58 is positioned between hot water supply conduit 22 and chilled water supply conduit 32. Pressure responsive switches 60 and 62 having normally open contacts 64 and 66 are located in series with the windings of compressor motor 68 and hot water pump motor 70, respectively.

Three-way valves 14, 16, 18 and 20 as well as valves 54, 56 and 58 and pressure switches 60 and 62 are operated by air drawn from high pressure supply tank 72 and main air supply pipe 74. Summer-winter changeover switch 76 permits air at supply line pressure of 20 p.s.i. to flow to the power elements of valves 54, 56 and 58 and to pressure switches 60 and 62 through branch line 51 when the switch is set for summer operation. With the switch 76 in this summer or open position, 20 p.s.i. air will also flow to the power element of three-way pneumatic control valve 80 through branch line 77. The purpose of control valve 80 is to supply air at either 20 p.s.i. from the main supply pipe 74 or at 13 p.s.i. from pressure reducing valve 82 to reversible action thermostats 84 and 86 located in each of the conditioned zones. Thermostats 84 and 86 work in a direction acting way when supplied with 13 p.s.i. air during winter operation and in a reverse way when supplied with 20 p.s.i. air during the summer season. The pressure of the air supplied to three-way valves 14, 16, 18 and 20 is regulated by thermostats 84 and 86. Each of these four valves has a normally open port communicating with the hot water circuit. As the air pressure supplied to the power elements of these valves by thermostat 84 or 86 is increased from 3 to 7.5 p.s.i., the hot water port modulates closed. A second port communicating with the chilled water circuit begins to open at 8.5 p.s.i. and is fully open at 12 p.s.i.

It is necessary to change the action of thermostats 84 and 86 during the winter months, because during that time hot water from chilled water supply conduit 32 is being directed into coils 10 and 12 through the port that normally passes chilled water in the summer season. Thus during winter operation, thermostats 84 and 86 supply increased air pressure to valves 14 and 16 and cause the chilled water port to open wider so as to supply more hot water to the coils as the temperature in the conditioned zones drops. In the summer, the action of the thermostats is reversed, and they modulate the chilled water port of valves 14, 16, 18 and 20 towards the open position as the temperature in the conditioned zones rises.

Reverse acting temperature controller 78 is located in branch air line 51 downstream of switch 76. Sensing bulb 79 of controller 78 is connected to chilled water return line 34 upstream of three-way changeover valve 54. Controller 78 acts as a safety device to prevent changeover from winter to summer operation by blocking the flow of pressurizing air to the various changeover valves and pressure switches if the water returning through conduit 34 as sensed by bulb 79 is at a temperature above 100° F. Such an excessively high return water temperature might damage the chiller or the refrigeration system of which it is a part.

The operation of the improved four-pipe heating and cooling system of FIGURE 1 is as follows. During mild weather conditions and the summer months, switch 76 would be set for summer operation so as to permit air at 20 p.s.i. pressure to flow to pressure switches 60 and 62 and to the power elements of control valves 80, 54, 56 and 58. This high pressure air causes contacts 64 and 66 of switches 60 and 62 to be closed so as to energize compressor motor 68 and hot water pump motor 70. Valve 80 will be positioned to supply 20 p.s.i. air to thermostats 84 and 86, thus setting the thermostats for summer operation. Valves 54 and 56 will be positioned to permit flow through chiller 2 and valve 58 will be closed, as shown in FIGURE 1. Chilled water pump 36 will also be running at this time, as its drive motor is wired to be operative during all seasons of the year. Thus both hot and chilled water will be circulated by pumps 28 and 36 respectively to coil inlet valves 14 and 16. These valves will be positioned to admit hot or cold water to coils 10 and 12 and outlet valves 18 and 20 will be positioned to direct the water to the appropriate return pipe depending upon the temperature in the conditioned zones as sensed by thermostats 84 and 86. In the situation illustrated in FIGURE 1, hot water is circulating through coil 10 and chilled water is circulating through coil 12 in another zone.

During the winter months when the heating load is particularly high, switch 76 is set for winter operation. This shuts off the supply of pressurizing air with the result that switch contacts 64 and 66 are opened, valve 80 is shifted to direct 13 p.s.i. air to the thermostats 84 and 86, three-way valve 54 is positioned to connect pipe 34 with cross-over pipe 52 and to close the port to the inlet of chiller 2, valve 56 is closed and valve 58 is opened. This sequence of events has the effect of isolating chiller 2, placing heater 4 in the chilled water circuit, and changing the action of thermostats 84 and 86. Pump 36, which is now the only pump running, will circulate water through return pipe 34, cross-over pipe 52, heater 4, conduit 22, open valve 58, supply pipe 32 and valves 14 and 16 to coils 10 and 12. Thermostats 84 and 86, now set for winter operation, will cause valves 14 and 16 to admit more hot water from pipe 32 as the temperature in the conditioned zones decreases. Coil outlet valves 18 and 20 will be actuated simultaneously with inlet valves 14 and 16 to direct the water to return pipe 34 and pump 36.

It will thus be seen that the larger size chilled water piping is utilized to circulate the greater quantities of hot water required for heating in the winter months. This permits the particular advantage of using smaller than standard size hot water supply and return pipes 24 and 26 respectively, which need carry only the minimum quantity of hot water required during mild weather. Thus considerable savings in installation costs are realized. At the same time, the use of separate hot and chilled water return pipes 26 and 34 precludes the mixing of hot and chilled water returning from different zones as occurs in the single return pipe of three-pipe systems. Since there will thus be no loss of the energy expended in heating the water due to mixing with cold water, high temperature hot water may be supplied from heater 4 in an efficient manner to provide an extremely rapid response to heating requirements in mild weather. Because of the loss of heating input resulting from the mixing of hot with cold water in a single return line, the three-pipe systems now in use do not lend themselves to the use of high temperature hot water and thus cannot provide as rapid a response to heating demands.

It is noted that with a four-pipe system incorporating the improved cross-over pipe arrangement of FIGURE 1, only hot water is available to heat exchange coils 10 and 12 in the winter since the chiller 2 is not in operation during this time. For this reason, the improved four-pipe system of this invention is most suitably adapted for use in apartment or office buildings and the like where all of the zones to be conditioned have an outside wall and thus require heating in the winter. Some buildings have interior zones requiring cooling during the winter because of high interior heat loads. When such buildings are air conditoned by the heating and cooling systems of this invention, these interior zones can be cooled in the winter by either low temperature outside air or a separate refrigeration plant.

The four-pipe heating and cooling system of FIGURE 2 includes all of the features of the system of FIGURE 1 described above, and in addition incorporates a dual condenser 41 which serves as the heat source during mild weather conditions. This system also employs means for controlling the heating output of heater 4, which is the sole source of heat during colder weather. Cross-over pipe 52 is again provided between the hot and chilled water circuits, so as to permit the use of the larger size chilled water pipes for the circulation of hot water during extremely cold weather. It will be noted that like reference numerals have been used in FIGURE 2 to identify like elements of FIGURE 1.

Dual condenser 41 may be cooled either by cooling tower water circulated through pipes 100 and 102 or by water drawn from warm water return pipe 26 through three-way valve 104 and conduit 106. The water is recirculated to the hot water circuit by conduit 108 and two-way valve 110. Pneumatic temperature controller 112 is positioned in branch air pressure line 61 leading to the power elements of valves 104 and 110, and has its control bulb 114 connected to hot water pipe 26 between pump 28 and three-way valve 104. Controller 112 is set at about 95° F. Controller 112 is used to divert the return water around dual condenser 41 when the return water temperature exceeds about 95° F. because at temperatures above this level, the return water would not be effective to cool the refrigerant being circulated through the dual condenser by compressor 38.

The hot water piping circuit of FIGURE 2, including supply pipe 24 and return pipe 26, is used in conjunction with heater 4 to meet the heating requirements at ambient temperatures as low as 15° F. Since this hot water piping is smaller than standard size, high temperature hot water must be supplied to meet the heating demand when the outside air temperature drops to lower levels approaching 15° F. In order to insure that heater 4 delivers water at the desired high temperature under such conditions, the temperature of the water leaving heater 4 is controlled by submaster pneumatic controller 116 having its sensing bulb 118 at the outlet of heater 4. Air at 20 p.s.i. is directed from main air supply line 74 through branch line 115 and controller 116 to the power element of flow control valve 120 located in steam line 122 leading to heater 4. Steam flows out of heater 4 through conduit 124. The temperature at which controller 116 operates is set by the air pressure delivered through branch line 117 from three-way valve 126 and temperature controller 128. Control bulb 129 for controller 128 is in the outside air. Controller 128 delivers air at a particular pressure through branch line 117 to the reset port of controller 116 depending upon the ambient temperature sensed by bulb 129, according to the following schedule:

| Atmospheric temperature: | Branch line 117 pressure, p.s.i. |
|---|---|
| 70° F. | 0 |
| 60° F. | 5 |
| 50° F. | 10 |
| 40° F. | 15 |
| 30° F. | 20 |

The temperature at which controller 16 maintains the water leaving heater 4 varies with the reset pressure supplied by branch line 117 as follows:

| Branch line 117 pressure: | Controller 116 temperature setpoint, ° F. |
|---|---|
| 0 p.s.i. | 80 |
| 5 p.s.i. | 110 |
| 10 p.s.i. | 140 |
| 15 p.s.i. | 170 |
| 20 p.s.i. | 200 |

Three-way valve 126 may be positioned to place branch line 117 in communication either with the outlet of controller 128 or with line 131 through which 15 p.s.i. air is delivered from pressure reducing valve 130.

A changeover temperature controller 132 having its bulb 134 in the outside air is also provided in the system of FIGURE 2. Controller 132 will automatically switch the system from cooling to heating when its set point of 15° F. is reached. The action of controller 132 may be overridden by manual-automatic switch 136 located in the air line leading from controller 132 to branch pressure lines 51 and 77. With switch 136 in the manual position, pressurizing air supplied by controller 132 during the cooling season would be closed off from branch control conduits 51 and 77 and the operator could still set the system for summer or winter operation by means of switch 76.

A typical sequence of operation for the system of FIGURE 2 would be as follows. With the outdoor temperature at 70° F. during the summer or mild weather seasons and with switch 136 set for automatic operation, changeover controller 132 would be opened to permit the flow of 20 p.s.i. air to branch control lines 51 and 77. Control valves 54, 56, 58 and 80 would be actuated to the positions shown in FIGURE 1 and contacts 64 and 66 of pressure switches 60 and 62 would be closed in the same manner as described with respect to the system of FIGURE 1. Both pumps 28 and 36 would thus be operating to supply hot and chilled water to valves 14 and 16 at the inlet to heat exchangers 6 and 8. Thermostats 84 and 86 will also be set for summer or cooling season operation by the 20 p.s.i. air flowing through valve 80. The air pressure delivered through branch control line 77 will also actuate three-way pneumatic valve 126 to the position in which the output of temperature controller 128 will be placed in communication with branch pressure line 117.

If, for example, the zone controlled by thermostat 86 is calling for cooling and the zone controlled by thermostat 84 is calling for heating, chilled water will be flowing to coil 12 through pipe 32 and valve 16, and hot water will be flowing to coil 10 through pipe 24 and valve 14. Valves 14, 16, 18 and 20 would thus be in the positions shown in FIGURE 1. At an outdoor temperature of 70° F., reverse acting temperature controller 128 will be putting out a zero branch pressure in accordance with the schedule set forth above. This pressure, when supplied through valve 126 and line 117 to the reset port of controller 116 will cause that controller to maintain the water at the outlet of heater 4 at a temperature of 80° F. The hot water returning from coil 10 through pipe 26 and pump 28 will thus be below 95° F., and the controller 112, through the action of its sensing bulb 114, will actuate valves 104 and 110 to the position shown in FIGURE 2 so as to direct the return water through condenser 41. In situations where the heat rejected in condenser 41 as a result of the cooling action of coil 12 will be sufficient to heat the water to the 80° F. setpoint of controller 116, as sensed by bulb 118, little or no steam would be supplied through valve 120 to heater 4.

When the outdoor temperature subsequently drops to a temperature of 30° F. in colder weather, controller 128 will provide a branch pressure of 20 p.s.i., which will act upon the reset port of hot water controller 116, to provide a hot water control temperature of 200° F. Controller 116 will thus actuate steam valve 120 to an open position sufficient to provide water at 200° F. at the outlet of heater 4. With 200° F. water flowing through supply line 24, the return water temperature as sensed by bulb 114 will of course be above 95° F. and controller 112 will thus position the valves 104 and 110 so as to direct the return water straight into heater 4 and to shut off flow through pipes 106, 108 and dual condenser 41. Thus at an outdoor temperature of 30° F., all of the heat will be supplied by the steam flowing through heater 4.

When the outdoor temperature further drops to a level below 15° F., as sensed by bulb 134, changeover controller 132 will shut off the flow of pressurizing air to control lines 51 and 77. This will cause the system to change over to winter or heating operation in the manner outlined with respect to the system of FIGURE 1. Valves 54, 56 and 58 will be actuated to the positions shown in FIGURE 2 so as to isolate chiller 2 and place the hot water heater 4 in communication with the chilled water piping circuit through crossover pipe 52. Pressure switch contacts 64 and 66 will be opened, and thermostats 84 and 86 will be set for heating season operation. Valves 14, 16, 18 and 20 will be positioned by the action of thermostats 84 and 86 as shown in FIGURE 2 to receive hot water from supply pipe 32 and direct it to return pipe 34 and pump 36. In addition, the shutting off of pressurizing air through branch line 77 will place three-way valve 126 in the position shown to direct air at the reduced pressure of 15 p.s.i. from line 131 to branch line 117. This will set temperature controller 116 at a control point of 170° F. With the hot water now circulating through the larger supply and return pipes 32 and 34, this is a sufficiently high water temperature to meet the heating requirements. Pressure reducing valve 130 could obviously be set to obtain any desired output pressure and the corresponding temperature setting of hot water controller 116.

The system disclosed in FIGURES 1 and 2 show single coils 10 and 12 in heat exchange units 6 and 8 in each of the conditioned zones, the one coil in each zone serving to heat or cool depending on whether hot or chilled water is being delivered to it. Heat exchange units incorporating separate heating and cooling coils could also be employed in each zone. Such an arrangement, and the piping for incorporating it in the systems of FIGURES 1 and 2, is illustrated in FIGURE 3. Like reference numerals are used to identify like elements of FIGURES 1 and 2. Thus, the zone controlled by thermostat 86 is provided with a relatively large coil 17 and a smaller coil 15 in heat exchanger 9 and 7, respectively. Similar large and small coils 13 and 11 of heat exhangers 5 and 3 respectively are located in the zone of thermostat 84. Straight through or two-way valves 19 and 23 are positioned in hot water supply pipe 24 at the inlet to coils 11 and 15 in each zone. Similar two-way valves 21 and 25 are located in chilled water supply pipe 32 at the inlet to coils 13 and 17 in each zone. Each of the smaller coils 11 and 15 is directly connected to hot water return pipe 26 and each of the larger coils 13 and 17 is directly connected to chilled water return pipe 34. Two-way valve 58 is again positioned in hot water pipe 22 between supply pipes 24 and 32.

The pneumatic control arrangement for reversing the action of thermostats 84 and 86 in going from summer or cooling season to winter or heating season operation is the same as in FIGURES 1 and 2. Thermostat 86 now controls valves 23 and 25 in its zone and thermostat 84 controls valves 19 and 21 in its zone. The action of the valves and thermostats is so coordinated as to utilize larger coils 17 and 13 for cooling in the summer and for heating in the winter. This permits the system to furnish more heat from the larger coils in vary cold weather. Small coils 11 and 15 are used for heating in mild weather and in the summer, if necessary. Valves 19 and 23 are normally open valves with a spring range of 3 to 6 p.s.i. Valves 21 and 25 are normally closed and modulate from this position to a fully open position over a spring range of 7 to 11 p.s.i. During the normal cooling season, thermostat 86, for example, would raise the branch pressure to the power elements of valves 23 and 25 so as to close valve 23 and open valve 25 to provide cooling from coil 17 as the temperature rises. In the winter, the action of thermostat 86 is changed as described above with respect to the system of FIGURE 1. Thus, as the demand for heating increases due to a temperature drop during winter operation, thermostat 86 will provide a greater branch pressure so as to close valve 23 and open valve 25. This will cause an increased amount of hot water to be directed into coil 17 from a large supply pipe 32, which will be receiving hot water from valve 58 during the heating season as explained above with respect to FIGURES 1 and 2.

From the foregoing description, it will be seen that the heating and cooling systems of this invention achieve the following improved results: separate return pipes for the hot and chilled water avoid mixing of these fluids and thus permit the efficient use of high temperature hot water; by employing relatively high temperature hot water, instant response to heating demands is provided; the use of relatively large size chilled water pipes for the circulation of hot water during the heating season permits the use of smaller than normal size hot water pipes with the result that installation costs are considerably reduced.

We do not desire to limit our invention to the particular embodiment shown and described, which is illustrative only. It is contemplated that changes may be made without departing from the spirit and scope of the invention as defined by the following claims.

We claim:
1. In an air conditioning system consisting of a plurality of zones to be conditioned, a heat exchange unit in each of said zones, a hot water piping circuit including a water heater arranged to circulate hot water to and from each of said heat exchange units and a separate chilled water piping circuit including a water chiller arranged to circulate chilled water to and from each of said heat exchange units; the improvement comprising means placing said water heater in fluid communication with said chilled water piping circuit whereby said latter circuit may be utilized to circulate hot water during periods of high heat demand.

2. The system of claim 1 wherein said heat exchange unit in each of said zones comprises a single coil; and further including three-way valves at the inlet and outlet of said coil in each of said zones, and thermostatic control means in each of said zones operable to selectively position said valves so as to place said coil in fluid communication with either said hot water piping circuit or said chilled water piping circuit.

3. The system of clam 2 wherein said thermostatic control means comprises a reversible action thermostat in each of said zones, and pneumatic means connected to each of said thermostats and operable to reverse the action of said thermostats at the time said water heater is placed in fluid communication with said chilled water piping circuit.

4. The system of claim 1 wherein said heat exchange unit in each of said zones comprises a first coil and a second coil; and further including a two-way valve at the inlet to said first coil connected to said chilled water circuit, a two-way valve at the inlet to said second coil connected to said hot water circuit, and thermostatic control means in each of said zones operable to modulate each of said valves from a fully closed to a fully open position.

5. The system of claim 4 wherein said second coil is relatively small in comparison to said first coil.

6. The system of claim 4 wherein said thermostatic control means comprises a reversible action thermostat in each of said zones, and pneumatic means connected to each of said thermostats and operable to reverse the action of said thermostats at the time said water heater is placed in fluid communication with said chilled water piping circuit.

7. The system of claim 1 wherein said means for placing said water heater in fluid communication with said chilled water piping circuit includes a first pipe connected between the inlet of said water heater and a point in said chilled water piping circuit upstream of said chiller, a second pipe connected between said heater outlet and said chilled water piping circuit at a point downstream of said water chiller, valve means in said chilled water piping circuit and in said first and second pipes, said valve means being selectively operable between a first position directing the flow of water in said chilled water piping circuit through said water chiller, and a second position directing the flow of water in said chilled water piping circuit through said first and second pipes and said water heater.

8. The system of claim 7 further including a pneumatic control system operable to actuate said valve means from said first to said second position.

9. The system of claim 8 wherein said pneumatic control system includes a controller responsive to the temperature of the water returning from said heat exchange units through said chilled water piping circuit, said controller being operative to prevent the actuation of said valve means from said second position to said first position when said temperature exceeds a predetermined value.

10. The system of claim 1 and further including a temperature controller having a reset port and operatively associated with said water heater so as to regulate the temperature of the water flowing therefrom, and a pneumatic control system operative to direct air within a preselected pressure range to said reset port during the normal cooling season and to direct air at a single preselected pressure to said reset port during periods of high heat demand.

11. The system of claim 1 and further including a refrigeration system comprising a compressor, condensor and evaporator interconnected in fluid flow relationship, said evaporator forming an integral part of said water chiller so as to produce the desired cooling effect therein; piping means leading from said hot water piping circuit to said condenser and returning from said condenser to said hot water piping circuit; valve means in said piping means, said valve means being responsive to the temperature of the water returning from said heat exchange units through said hot water piping circuit and operative to direct water from said hot water piping circuit through said piping means and said condenser when said temperature is below a predetermined value.

References Cited by the Examiner
UNITED STATES PATENTS

| | | | |
|---|---|---|---|
| 2,557,035 | 6/1951 | Lichty | 165—26 |
| 3,195,622 | 7/1965 | Hauflor et al. | 165--101 |
| 3,241,602 | 3/1966 | Andreassen | 165—50 |

MEYER PERLIN, *Primary Examiner.*

CHARLES SUKALO, *Assistant Examiner.*